United States Patent [19]
Kawada et al.

[11] Patent Number: 5,515,429
[45] Date of Patent: May 7, 1996

[54] BACKUP APPARATUS AGAINST LINE DEFECT AND BACKUP METHOD AGAINST LINE DEFECT

[75] Inventors: Noboru Kawada; Michiko Narita, both of Kawasaki, Japan

[73] Assignee: Fujitsu Limited, Kawasaki, Japan

[21] Appl. No.: 330,604

[22] Filed: Oct. 28, 1994

Related U.S. Application Data

[63] Continuation of Ser. No. 849,979, Mar. 12, 1992, abandoned.

[30] Foreign Application Priority Data

Mar. 12, 1991 [JP] Japan .................... 3-046336

[51] Int. Cl.$^6$ .................................................. H04M 3/08
[52] U.S. Cl. ...................... 379/279; 379/26; 379/98; 370/16; 340/825.16
[58] Field of Search .............. 379/279, 98, 93, 379/94, 1, 26; 370/13, 14, 16, 110.1; 340/825.16

[56] References Cited

U.S. PATENT DOCUMENTS

| | | | |
|---|---|---|---|
| 4,119,815 | 10/1978 | Frankfort et al. | 379/216 |
| 4,998,274 | 3/1991 | Ephraim | 379/158 |
| 5,151,896 | 9/1992 | Bowman et al. | 370/85.13 |
| 5,210,740 | 5/1993 | Anzai et al. | 370/16 |

FOREIGN PATENT DOCUMENTS 0413827 2/1991 European Pat. Off. .

OTHER PUBLICATIONS

J. F. Day, et al., "Networking Voice and Data With A Digital PBX", AT&T Technology, vol. 2, No. 3, pp. 22–29, 1987, Short Hills, NJ.

L. H. Eberl, et al., "Integrated ISDN D-Server For Intelligent Newtorking", Globecom '89, Session 15, Paper 4, vol. 1, pp. 1–4, 27 Nov. 1987, Dallas, TX.

*Primary Examiner*—Ahmad F. Matar
*Attorney, Agent, or Firm*—Staas & Halsey

[57] ABSTRACT

A backup apparatus in a communication system, functioning such that when an analog dedicated line is working properly, controllers on a host unit side and a terminal unit side control respective switching circuits so as to connect a modem on the host unit side with the analog dedicated line and a modem on the terminal unit side with the analog dedicated line. Thus, data is transmitted and received between the host unit and the terminal unit over the analog dedicated line. When the defect detecting portion of the modem detects occurrence of a line defect, the controller of each backup unit controls the switching circuit and the ISDN interface portion so as to connect the host unit and the terminal unit over the ISDN network. Thereafter, until the analog dedicated line restores from the defect, data communication is made between the host unit and the terminal unit over the ISDN network.

9 Claims, 12 Drawing Sheets

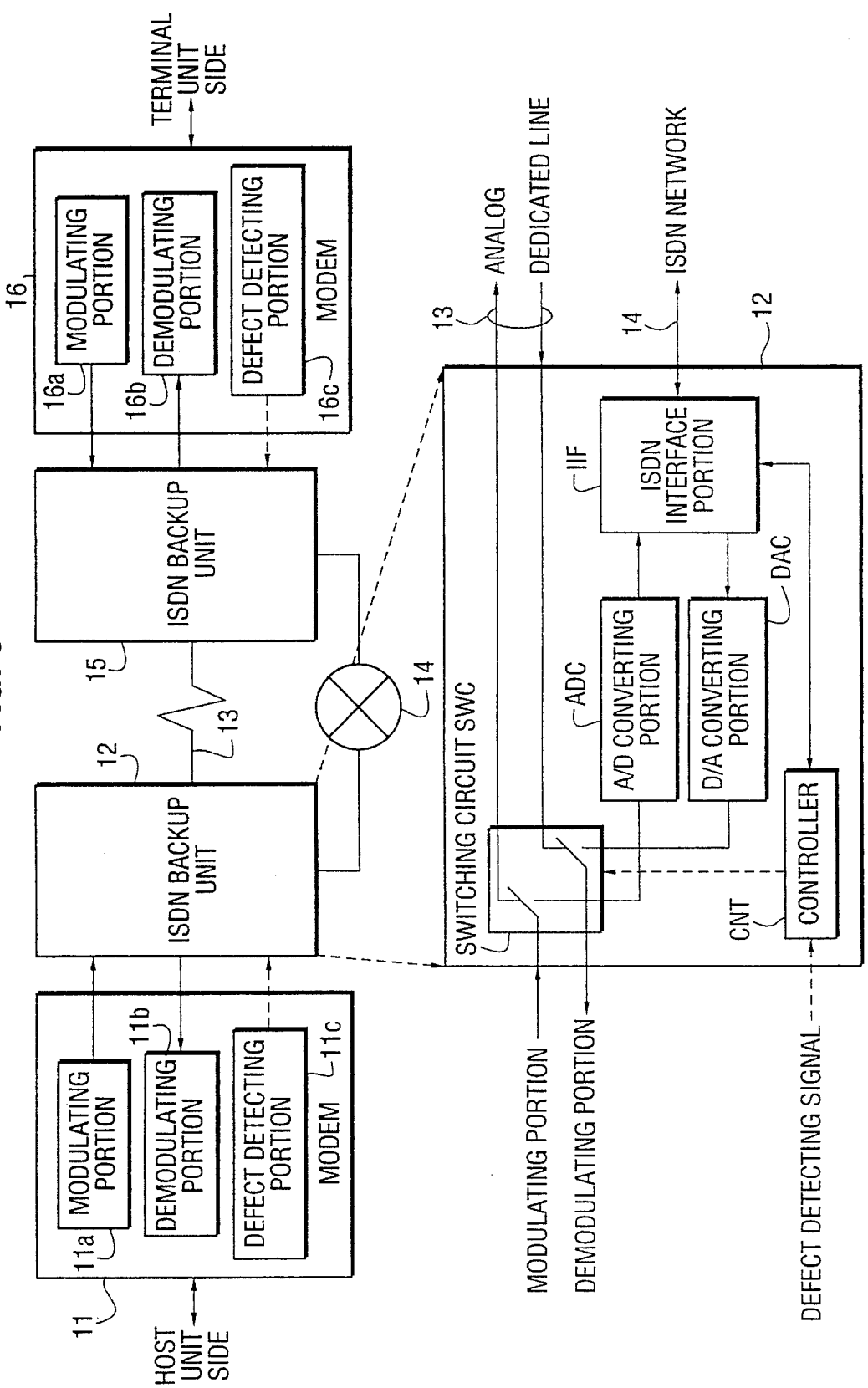

BACKUP APPARATUS AGAINST LINE DEFECT AND BACKUP METHOD AGAINST LINE DEFECT

This application is a continuation of application Ser. No. 07/849,979, filed Mar. 12, 1992, now abandoned.

BACKGROUND OF THE INVENTION

1. Field of the Invention

The present invention relates to a backup system against line defects and, in particular, relates to a backup apparatus against line defects and to a backup method against line defects in a system in which data are transmitted and received over an analog dedicated line in a normal state and over an ISDN line upon occurrence of a line defect.

2. Description of the Related Art

Data communication networks are becoming necessary infrastructures for companies' activities. Thus, if a network goes down, company activities are seriously affected. Therefore, highly reliable, low cost networks are strongly desired. To improve reliability, backup systems for switching from a dedicated line to another line upon an occurrence of a line defect have been used.

FIG. 1 (PRIOR ART) is a block diagram of a conventional backup system, comprising a host unit 1, a modem 2 on the host unit side, a dial backup unit (DBU) 3 on the host unit side, an analog dedicated line 4, a dial backup unit (DBU) 5 on a terminal unit side, a modem 6 on the terminal unit side, a terminal unit 7, and a public telephone line 9 for use in backing up data communications upon occurrence of a line defect.

The modems 2 and 6 are provided with a modulating portion, a demodulating portion, and a defect detecting portion. The modulating portion is for receiving a digital signal from the host unit 1 or the terminal unit 7, converting the digital signal into an analog signal in a voice band, and transmitting the analog signal to the line. The demodulating portion is for receiving an analog signal in a voice band from a line, converting the analog signal in the voice band into a digital signal, and transmitting the digital signal to the host unit 1 or the terminal unit 7. The defect detecting portion is for determining whether or not a received signal contains a carrier (carrier down) and whether or not the signal quality has deteriorated, indicating occurrence of a line defect.

If no line defect occurs, data communication is made between the host unit 1 and the terminal unit 7 over the analog dedicated line 4. However, if a line defect is detected, under the control of the dial backup units 3 and 5, data communication is made between the host unit 1 and the terminal unit 7 over the public telephone line 9. When the defect in the analog dedicated line restores from the defect, data communication is made over the analog dedicated line once again.

The amount of data transmitted over an analog line is theoretically up to 25 kbps. However, the actual amount of data available is 19.2 kbps at most. In addition, to accomplish a high speed communication of 19.2 kbps, the lines used should be of high quality (small deterioration factors). The conventional public telephone lines cannot satisfactorily support such high speed communication. Consequently, if data communication is backed up, the transmission speed decreases.

In addition, as shown in FIG. 2(A) (PRIOR ART), the conventional backup system only applies to a communication system with a point-to-point connecting structure. Thus, as shown in FIG. 2(B) (PRIOR ART), in a communication system with a multi-point connecting structure where data are transmitted from the host unit 1 over the dedicated line 4 and then branched to a plurality of terminal units, data communication cannot be backed up. In the multi-point connecting structure, until the dedicated line 4 restores from a defect, the system continues to be down.

SUMMARY OF THE INVENTION

An object of the present invention is to provide a backup system against line defects, and hence to accomplish high speed, high quality data communication over an ISDN line. Another object of the present invention is to provide a backup system against line defects in a communication system in a multi-point connecting structure.

The present invention comprises a backup apparatus against line defects for use in a communication system for making data communications over an analog line through a modem. The backup apparatus comprises an ISDN interface portion, an A/D (Analog-to-Digital) converting portion, a (Digital-to-Analog) D/A converting portion and a controller portion. The ISDN interface portion is for transmitting and receiving a digital signal over an ISDN line. The A/D converting portion is for receiving an analog signal from the modulating portion of the modem, converting the analog signal into a digital signal, and supplying the digital signal to the ISDN interface portion. The D/A converting portion is for receiving a digital signal from the ISDN interface portion, converting the digital signal into an analog signal, and supplying the analog signal to the demodulating portion of the modem. The controller portion is arranged to transmit and receive data over the analog line when the analog line is normal and to transmit and receive data through the A/D converting portion, the D/A converting portion, and the ISDN interface portion over the ISDN network when a defect occurs in the analog line. The modem comprises a modulating portion for converting a digital signal into an analog signal and for supplying the analog signal and a demodulating portion for converting an analog signal into a digital signal and for supplying the digital signal.

Since data communication is made over the analog line in a normal state and over the ISDN line upon occurrence of a defect, the data communication is backed up with high speed and high quality. Thus, a highly reliable network is accomplished.

BRIEF DESCRIPTION OF DRAWINGS

FIG. 3 is a block diagram of a system in an embodiment of the present invention;

DESCRIPTION OF PREFERRED EMBODIMENTS

Figure 1:
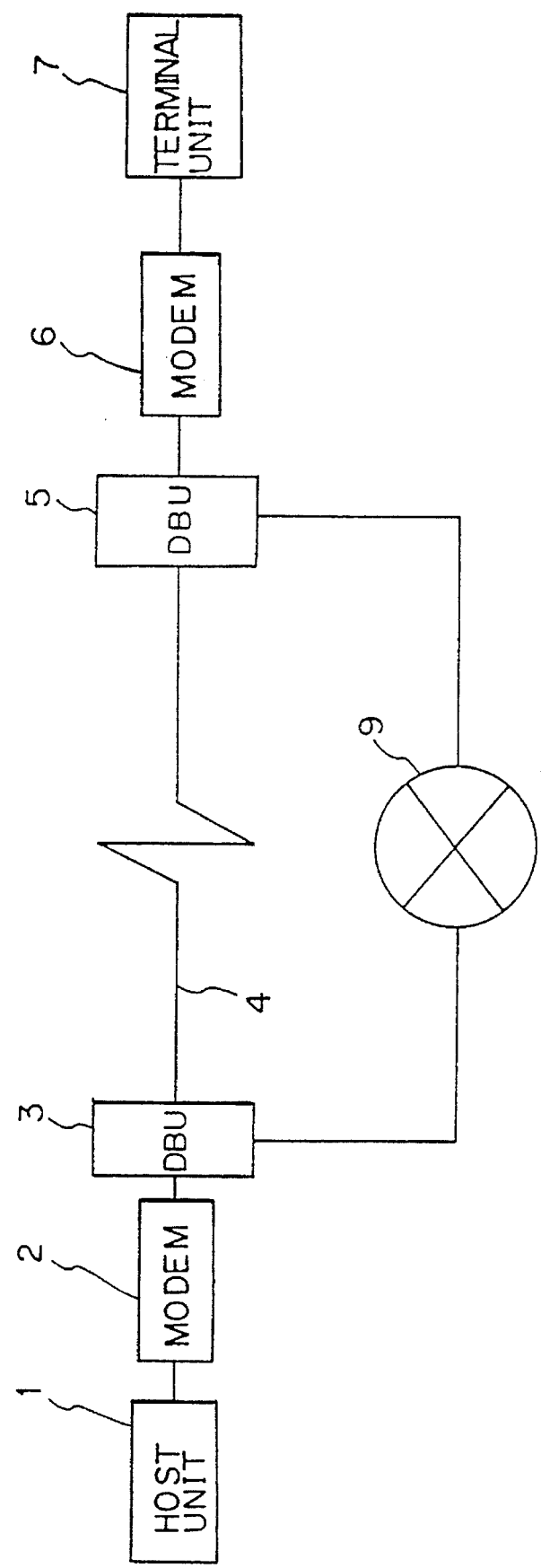
FIG. 1 (PRIOR ART) is a block diagram of a conventional backup system.
Figure 2A:
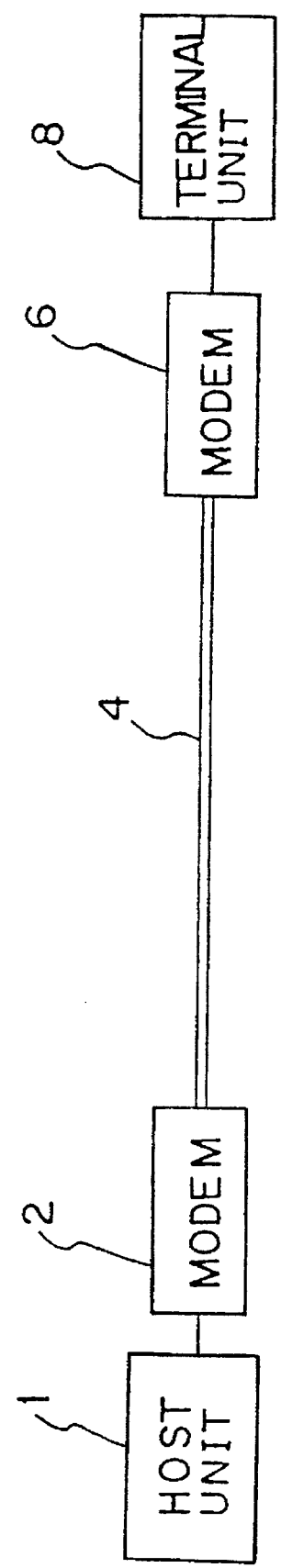
FIGS. 2(A) (PRIOR ART) and 2(B) (PRIOR ART) are block diagrams of connecting structures of communication systems.
Figure 2B:
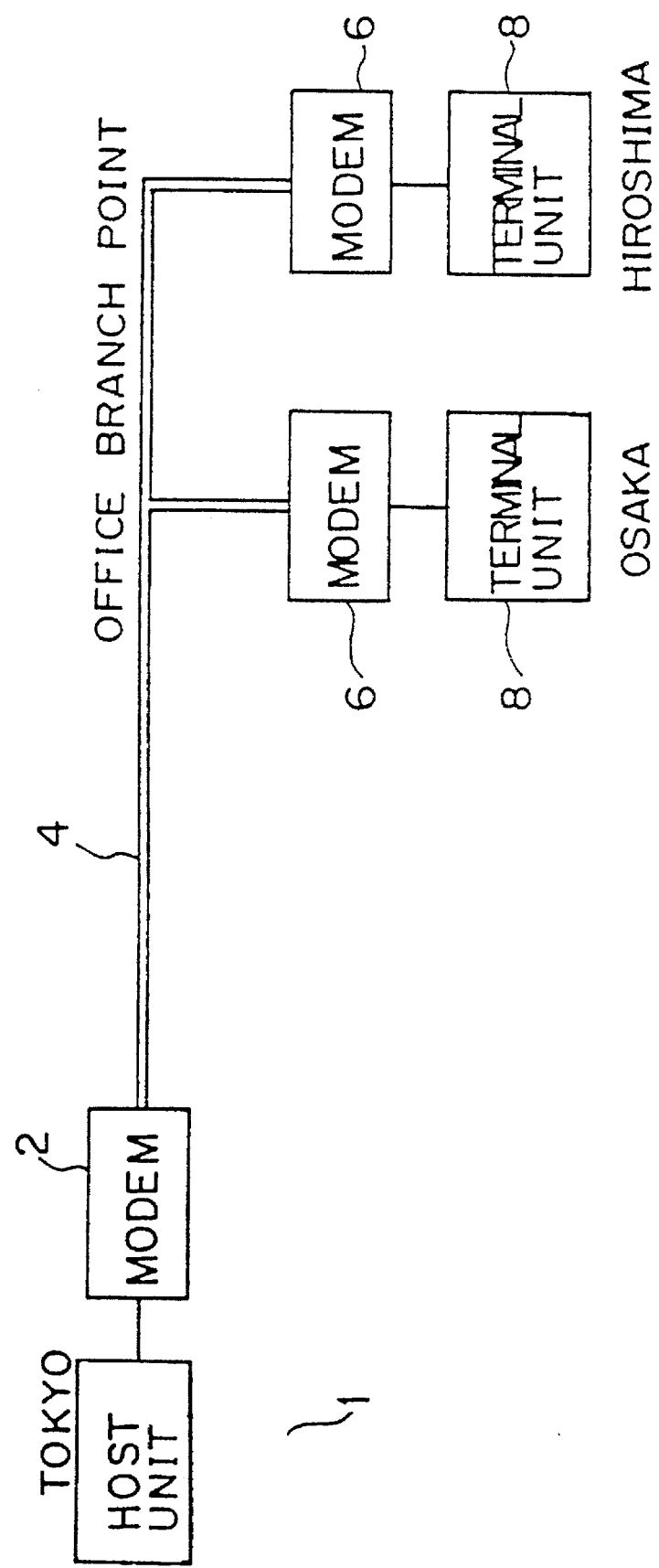

Preferred embodiments of the present invention are described in detail with reference to the accompanying drawings. FIG. 3 is a block diagram of a system in an embodiment of the present invention, comprising a modem 11 on a host unit side, an ISDN (Integrated Service Digital Communication Network) backup unit 12 on the host unit side, an analog dedicated line 13, an ISDN network 14, an ISDN backup unit 15 on the terminal unit side, and a modem 16 on the terminal unit side.

11a, and 16a of the modems 11 and 16 are modulating portions for converting a digital signal into an analog signal and for supplying the analog signal. 11b and 16b are demodulating portions for converting an analog signal into a digital signal and for supplying the digital signal. 11c and 16c are defect detecting portions for detecting a defect which takes place over the analog dedicated line.

In the ISDN backup units 12 and 15, reference symbol IIF represents an ISDN interface portion for transmitting and receiving digital data over the ISDN line. Reference symbol ADC represents an A/D (Analog-to-Digital) converting portion for receiving an analog signal from the modulating portion 11a, for sampling the analog signal, for converting the sampled analog signal into a digital signal, and for supplying the digital signal to the ISDN interface portion. Reference symbol DAC represents a D/A (Digital-to-Analog) converting portion for receiving a digital signal through the ISDN interface portion IIF, for converting the digital signal into an analog signal, and for supplying the converted signal to the demodulating portion 11b. Reference symbol CNT represents a controller for controlling a transmission state of data. Reference symbol SWC represents a switching circuit for switching a line.

When no line defect occurs, the controller CNT in the ISDN backup units 12 and 15 controls the switching circuit SWC so as to connect the modems 11 and 16 with the analog dedicated line 13 and to transmit and receive data between the host unit and the terminal unit over the analog dedicated line 13. When a line defect occurs and this defect is detected by the defect detecting portions 11c and 16c of the modems 11 and 16, the controller CNT of the ISDN backup units 12 and 15 controls the switching circuit SWC and the ISDN interface portion IIF to connect the host unit and the terminal unit over the ISDN network 14. Thereafter, until the analog dedicated line 13 restores from the defect, data communication is made between the host unit and the terminal unit over the ISDN network 14. As described above, data communication is normally made over the analog dedicated line 13. When a defect takes place, data communication is made over the ISDN network 14. Thus, even while data communication is backed up, high speed and high quality data communication can be accomplished.

While a line defect is taking place, when data communication is made from the host unit to the terminal unit over the ISDN network 14, the A/D converter ADC in the ISDN backup unit 12 on the host unit side receives an analog signal from the modulating portion 11a of the modem on the host unit side, converts the analog signal in accordance with a clock of the ISDN network, and transmits the digital signal to the ISDN network 14 through the ISDN interface portion IIF. The D/A converting portion DAC in the ISDN backup unit 15 on the terminal unit side receives a digital signal from the ISDN network 14 through the ISDN interface portion IIF, converts the digital signal into an analog signal, and supplies the analog signal to the demodulating portion 16b of the modem 16 on the terminal unit side. The demodulating portion 16b converts the analog signal into a digital signal in accordance with a reception timing extracted from the analog signal and transmits the digital signal to the terminal unit. As described above, since each ISDN backup unit has the A/D converting function and the D/A converting function, while data communication is being backed up over the ISDN network, it is not necessary to change the timing of the modem. Thus, it is not necessary to synchronize the timings on the host unit side and the terminal unit side with the clock of the ISDN network. Thus, the system of the present invention can be readily applied to a terminal unit and a host unit which do not have a function for synchronizing with the ISDN network.

Moreover, in a communication system having a multi-point connection where data transmitted from one unit on a host unit side over a dedicated analog line is branched and transmitted simultaneously to a plurality of terminal units, an A/D converting portion ADC of the backup unit on the host unit side is provided with two A/D converters referred to as a first A/D converter and a second A/D converter and a D/A converting portion DAC is provided with two D/A converters referred to as a first D/A converter and a second D/A converter. When data communication is backed up over the dedicated line, an ISDN interface portion IIF receives data from the first and second A/D converters and transmits them to an ISDN network 14. The data received from the first A/D converter and the data received from the second A/D converter are referred to as first channel data and second channel data, respectively. The first channel data and the second channel data received from the ISDN network 14 are supplied to the first D/A converter and the second D/A converter, respectively. Each piece of data received from these D/A converters is composited and then supplied to the demodulating portion of the modem. In this construction, even if a line defect occurs in the communication system having the multi-point connection, data communication can be backed up over the ISDN network.

Then, embodiments of communication systems having point-to-point connection and systems having multi-point connection are described.

(a) A first embodiment of the present invention
Overall construction

Figure 4:
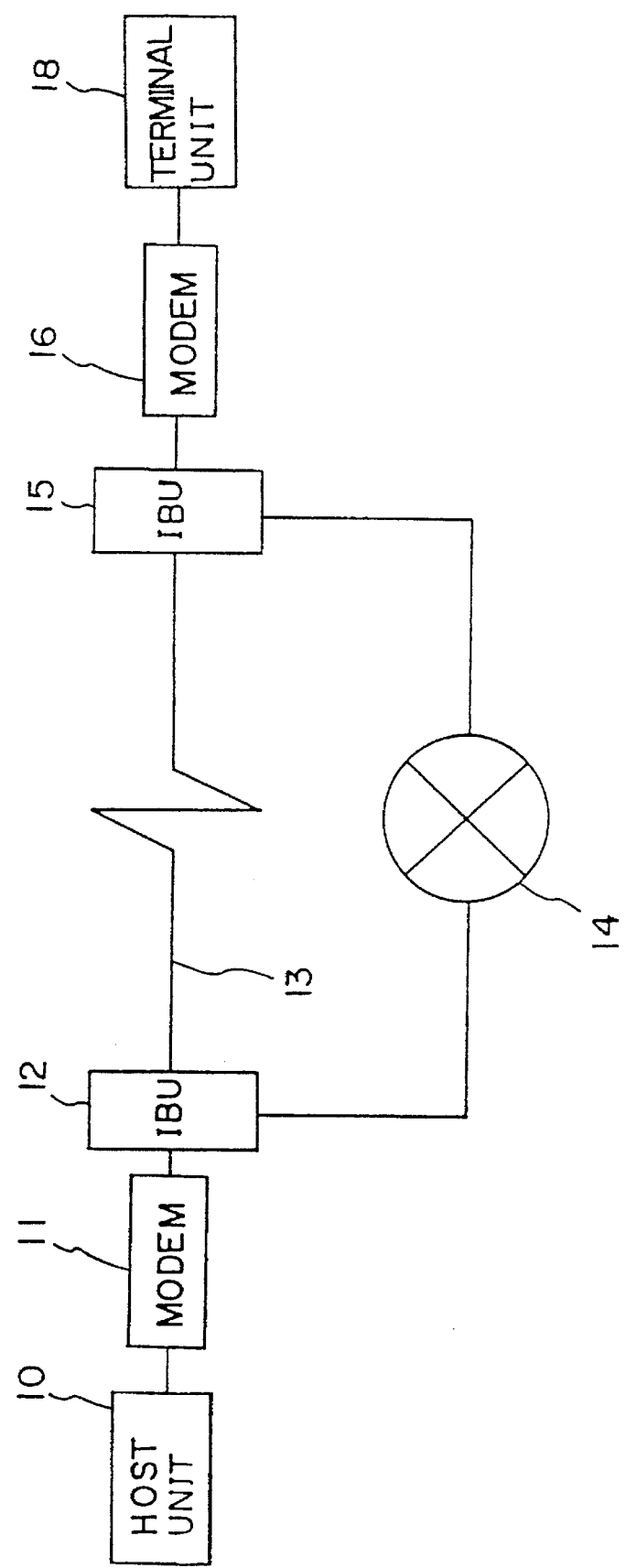
FIG. 4 is a block diagram of a point-to-point connection in accordance with a first embodiment of the present invention.

FIG. 4 is a block diagram of a communication system having a point-to-point connection in accordance with a first embodiment of the present invention. The same portions as in FIG. 1 have the same reference numerals. Additionally, the embodiment shown in FIG. 4 comprises a host unit 10, a modem 11 on the host unit side, an ISDN backup unit (IBU) 12 on the host unit side, an analog dedicated line 13, an ISDN network 14, an ISDN backup unit (IBU) 15 on the terminal unit side, a modem 16 on the terminal unit side, and the terminal unit 18.

When no line defect occurs, the ISDN backup units 12 and 15 connect the modem 11 and 16 to the analog dedicated line 13 and transmit and receive data between the host unit 10 and the terminal unit 18 over the analog dedicated line 13.

When a line defect occurs, the ISDN backup units 12 and 15 disconnect the modems 11 and 16 from the analog dedicated line 13 and connect the host unit and the terminal unit over the ISDN network 14. Thereafter, until the analog dedicated line 13 restores from the line defect, data communication is made between the host unit and the terminal unit over the ISDN network 14.

Constructions of modem and ISDN backup unit

Figure 5:
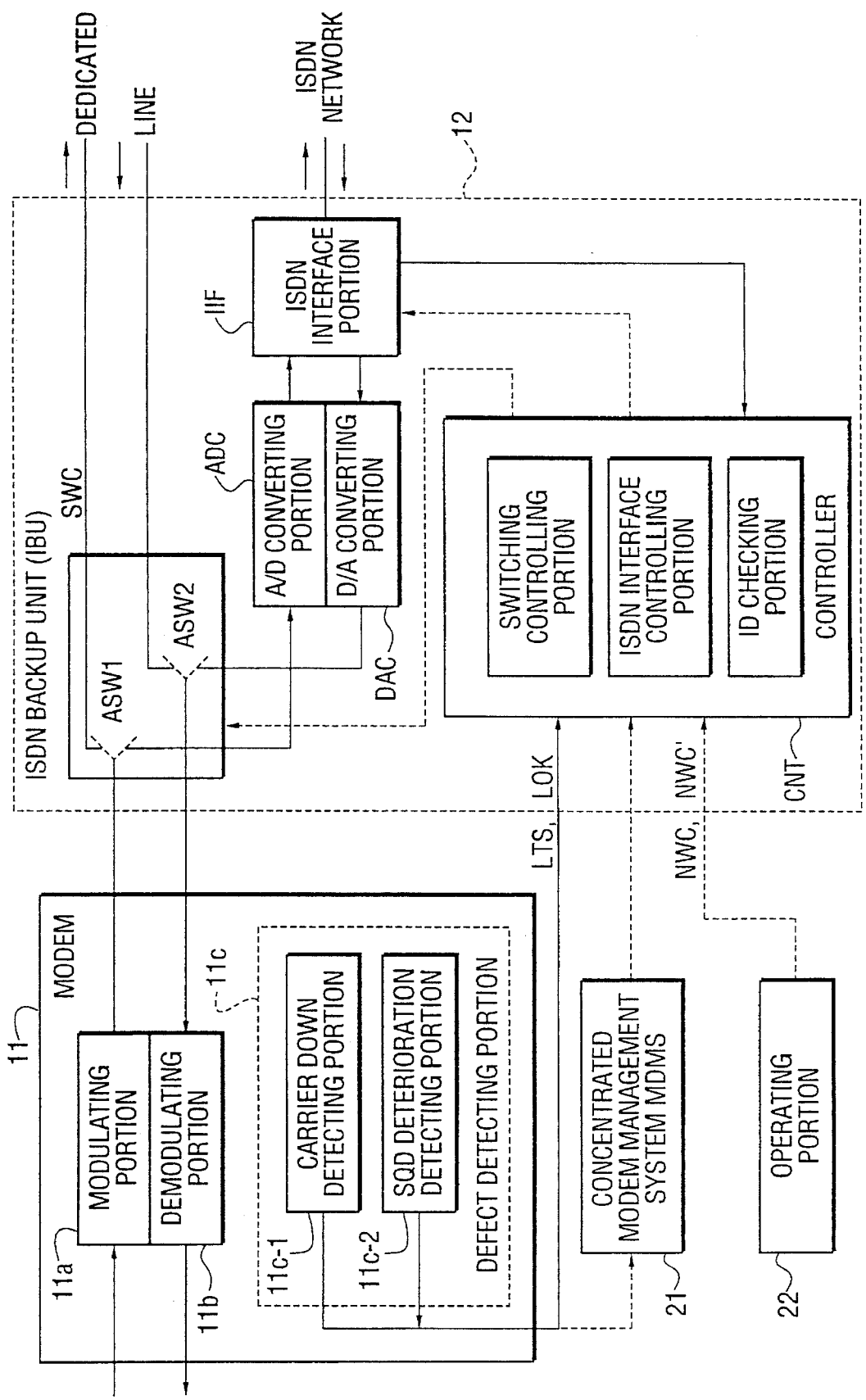
FIG. 5 is a block diagram of a modem and a backup unit.

FIG. 5 is a block diagram of a modem and sn ISDN backup unit in accordance with the embodiment shown in FIG. 4. Although FIG. 5 illustrates a modem and an ISDN backup unit (IBU) on a host unit side, their constructions are the same as those of a modem and an ISDN backup unit on a terminal unit side.

FIG. 5 shows a modem 11, an ISDN backup unit 12, a centralized modem management system (MUMS) 21, and an operating portion 22.

In the modem 11, reference numeral 11a represents a modulating portion for receiving a digital signal from the host unit, for converting the digital signal into an analog signal, and for supplying the analog signal to a line. Reference numeral 11b represents a demodulating portion for receiving an analog signal from the line, for converting the analog signal into a digital signal, and for supplying the digital signal to the host unit. Reference numeral 11c represents a defect detecting portion for detecting a defect which occurs in the analog dedicated line 13. The defect detecting portion 11c is provided with a carrier down detecting portion 11c-1 and an SQD (Signal Quality Deterioration); deterioration detecting portion 11c-2. The carrier down detecting portion 11c-1 determines whether or not a carrier is detected in a signal received from the line for a predetermined time period (carrier down). The SQD deterioration detecting portion 11c-2 detects deterioration of quality of a received signal.

FIG. 5 does not illustrate a practical construction of the carrier down detecting portion 11c-1. However, the carrier down detecting portion 11c-1 is constructed of a carrier detecting circuit and an MPU (Micro Processing Unit). The carrier detecting circuit is constructed of, for example, an amplifier, a rectifying circuit, an integrating circuit, a slicer circuit, and so forth. When a carrier is not detected for a predetermined time period, the carrier down detecting portion 11c-1 determines that a defect is occurring in a line and supplies a defect occurrence detecting signal to the backup unit.

The SQD deterioration detecting portion 11c-2 is constructed of, for example, an error signal detecting circuit, a counter, and so forth. The error signal detecting circuit detects an error signal representing a difference between an equalized output signal of a received signal and a reference signal. The SQD deterioration detecting portion 11c-2 determines whether or not an error signal exceeds a predetermined reference value and counts the number of these events so as to determine the signal quality. When the SQD deterioration detecting portion 11c-2 detects the deterioration of the signal quality, it supplies a defect occurrence detecting signal LTS to the backup unit.

In the ISDN backup unit 12, reference symbol IIF represents an ISDN interface portion for transmitting digital data to the ISDN network 14 and for receiving digital data therefrom. The ISDN interface portion IIF is constructed of, for example, a compact SCM (S-interface Control Module); (produced by Fujitsu Limited). Reference symbol ADC represents an A/D converting portion for receiving an analog signal from the modulating portion 11a, for sampling the analog signal in synchronization with a clock of the ISDN network, for converting the sampled value into a digital signal, and for supplying the digital signal to the ISDN interface portion IIF. Reference symbol DAC represents a D/A converting portion for receiving a digital signal from the ISDN interface portion IIF, for converting the digital signal into an analog signal, and for supplying the analog signal to the demodulating portion 11b. Reference symbol CNT represents a controller for controlling a transmission state of data. Reference symbol SWC represents a switching circuit for switching a line. The switching circuit is provided with analog switches ASW1 and ASW2.

The controller CNT is provided with a switching controlling portion, an ISDN interface controlling portion, and an ID checking portion. When a defect occurs, the controller CNT executes a switching control between the analog dedicated line 13 and the ISDN network 14. When the controller CNT receives a defect occurrence detecting signal LTS representing that a defect is occurring in the analog dedicated line 13 or when the operator inputs a line switching signal NWC from the operating portion 22, the controller CNT switches to the ISDN network 14. The defect occurrence detecting signal LTS is inputted directly from the defect detecting portion 11c of the modem 11 or from the centralized modem management system (MDMS) 21. The centralized modem management system 21 is constructed of, for example, an F1960 modem network management system (produced by Fujitsu Limited).

Overall operation

Figure 6:
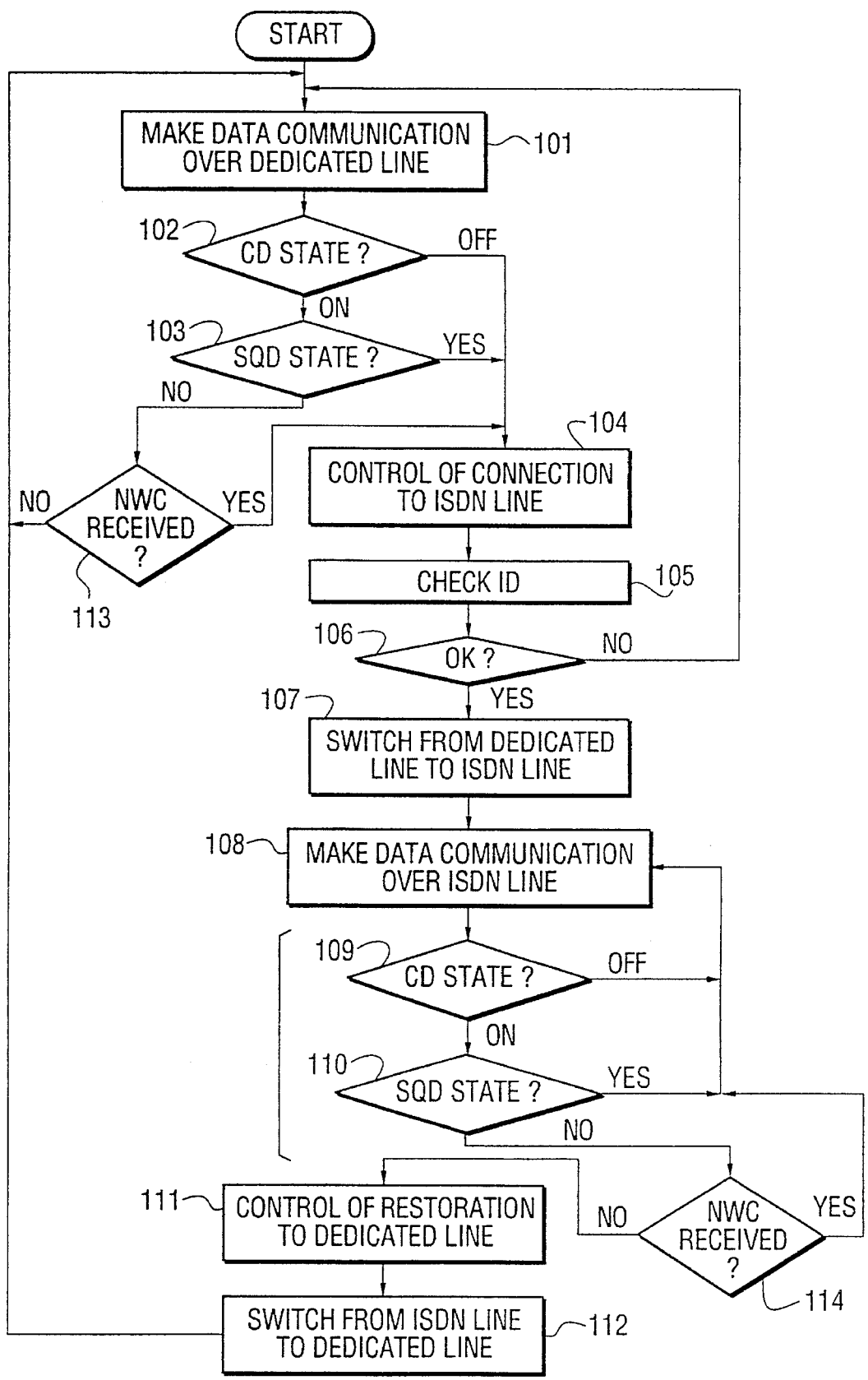
FIG. 6 is a flowchart of an ISDN backup control process.

FIG. 6 is a flowchart of an ISDN backup control process of the present invention. The entire operation of an ISDN backup apparatus is described in detail by referring to the flowchart.

In the initial state, where no defect takes place over an analog dedicated line 13, a controller CNT of ISDN backup units 12 and 15 controls the switching circuit SWC so that it connects modems 11 and 16 with the analog dedicated line 13. Thus, data communication is made between a host unit 10 and a terminal unit 18 over the analog dedicated line 13 (at step 101).

While data communication is being made over the analog dedicated line 13, the controller CNT of the ISDN backup units 12 and 15 determines whether or not a defect occurrence detecting signal LTS or a line switching signal NWC has been received so as to detect a carrier down (CD off) and deterioration of signal quality (SQD deterioration) (at steps 102 and 103).

When neither the defect occurrence detecting signal LTS nor the line switching signal have been received, see step 113, the data communication is continued over the analog dedicated line 13. When either the defect occurrence detecting signal LTS or the line switching signal NWC has been received, the backup control process is performed over the ISDN network 14 (step 104). In other words, when the controller CNT of the ISDN backup unit on the host unit side receives the defect occurrence detecting signal LTS or the line switching signal NWC, it controls the ISDN interface portion IIF and makes a connection to the party on D channel in accordance with the ISDN protocol.

After the terminal unit and the host unit have been connected, the party's ID (for example, a telephone number) is received and checked. When the received ID differs from a preset ID, the controller CNT does not switch to the ISDN network 14. Thereafter, the process returns to step 101. At this step, the controller CNT continues to make data communication over the analog dedicated line 13 (at steps 105 and 106).

When the received ID accords with the ID of the preset party, the controller CNT switches the analog switches ASW1 and ASW2 to the respective positions shown with the dotted lines of FIG. 5. Thus, the controller CNT connects the modulating portion 11a of the modem 11 with the A/D converting portion ADC and the demodulating portion 11b thereof with the D/A converting portion DAC and switches to the ISDN network 14 (at step 107). Likewise, the ISDN backup unit 15 on the terminal unit side switches the line from the analog dedicated line to the ISDN network.

Thereafter, data communication is made over the ISDN network 14 (at step 108). Data communication over the ISDN network 14, for example, from the host unit 10 to the terminal unit 18 is made as follows. The A/D converter ADC of the ISDN backup unit 12 on the host unit side receives an analog signal from the modulating portion 11a of the modem 11 on the host unit side, converts the analog signal into a digital signal in synchronization with a clock of the ISDN network, and transmits the digital signal to the ISDN network 14 through the ISDN interface portion IIF.

On the other hand, the D/A converting portion DAC of the ISDN backup unit on the terminal unit side receives a digital signal from the ISDN network 14 through the ISDN interface portion IIF, converts the digital signal into an analog signal, and supplies the analog signal to the demodulating portion of the modem 16 on the terminal unit side. The demodulating portion converts the analog signal into a digital signal in synchronization with a reception timing extracted from the analog signal and then supplies the digital signal to the terminal unit 18.

On the other hand, data communication from the terminal unit 18 to the host unit 10 over the ISDN network 14 is made as follows. The A/D converter ADC of the ISDN backup unit 15 on the terminal unit side receives an analog signal from the modulating portion of the modem 16 on the terminal unit side, converts the analog signal into a digital signal in synchronization with a clock of the ISDN network, and transmits the digital signal to the ISDN network 14 through the ISDN interface portion IIF. The D/A converting portion DAC of the ISDN backup unit 12 on the host unit side receives a digital signal from the ISDN network 14 through the ISDN interface portion IIF, converts the digital signal into an analog signal, and supplies the analog signal to the demodulating portion 11b of the modem 11 on the host unit side. The demodulating portion lib converts the analog signal into a digital signal in synchronization with a reception timing extracted from the analog signal, and supplies the digital signal to the host unit.

While data communication is made over the ISDN network 14, the controller CNT monitors whether or not the line normal signal LOK has been received due to restoration from carrier down (CD ON) and detection of the normal signal quality (normal SQD) or monitors whether or not the line switching signal NWC' has been inputted to the analog dedicated line 13 (at steps 109 and 110).

When neither the line normal signal LOK nor the line switching signal NWC' have been received, see step 114, the data communication over the ISDN network 14 continued. When either the line normal signal LOK or the line switching signal NWC' has been received, the data communication over the ISDN network is disconnected through the ISDN interface portion IIF. In addition, the switching circuit SWC connects the modem 11, 16 with the analog dedicated line 13 (at steps 111 and 112). Thereafter, the process returns to step 101, where, data communication over the analog dedicated line is made.

The above embodiment can apply to a backup system of a communication system having a point-to-point connection. Then, another backup system which can apply to a communication system having a multi-point connection is described.

(b) Second embodiment of the present invention

Figure 7:
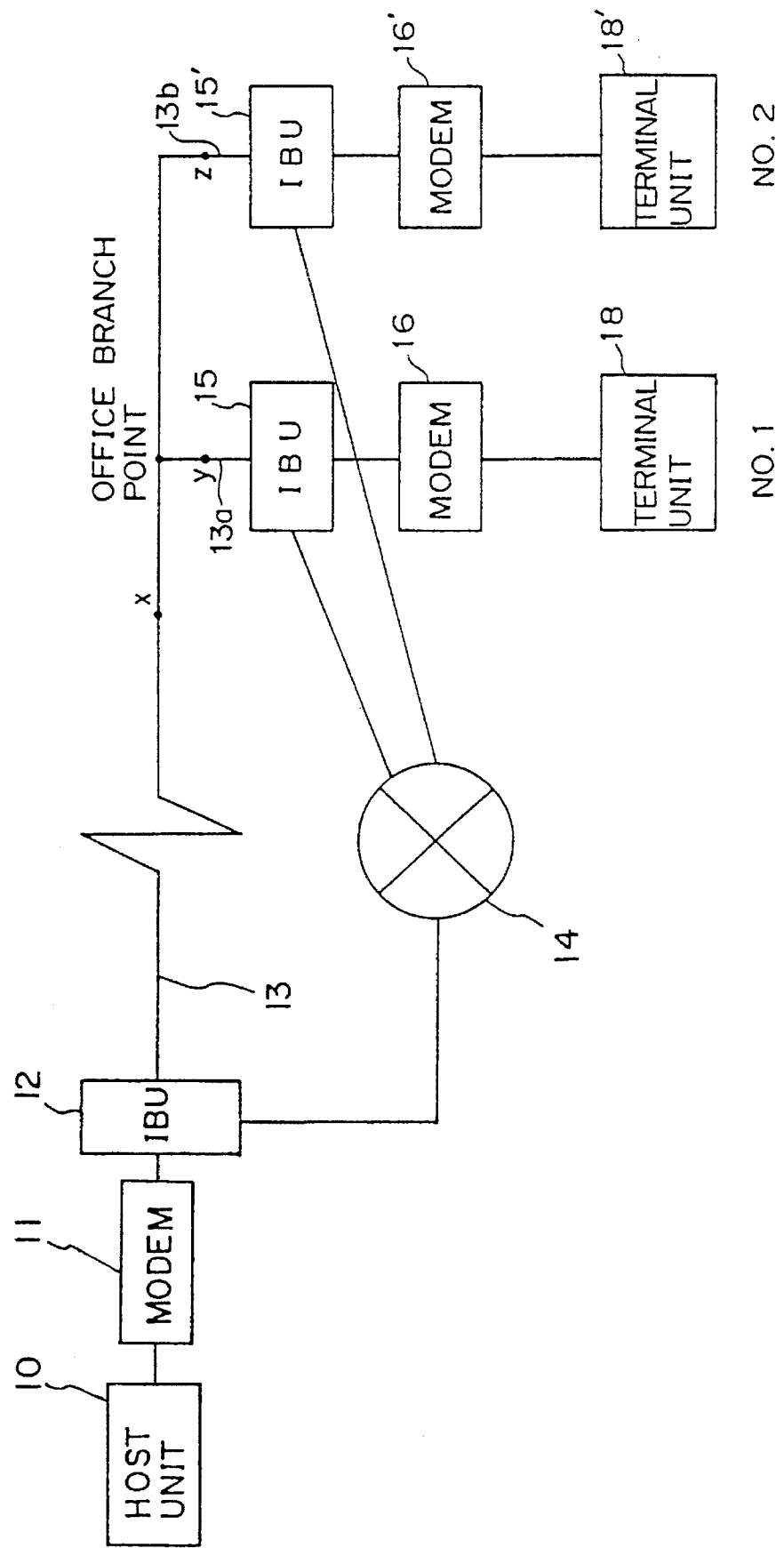
FIG. 7 is a block diagram of a multi-point connection in accordance with a second embodiment of the present invention.

FIG. 7 is a block diagram of a multi-point connection in accordance with a second embodiment of the present invention. This embodiment applies to a backup system of a communication system having a multi-point connection. In the figure, reference numeral 10 represents a host unit, reference numeral 11 represents a modem on a host unit side, reference numeral 12' represents an ISDN backup unit (IBU) on the host unit side, reference numeral 13 represents an analog dedicated line 13, reference numeral 14 represents an ISDN network, reference numerals 15 and 15' represent ISDN backup units (IBUs) on a terminal unit side, reference numeral 16 and 16' represent modems on the terminal unit side, and reference numerals 18 and 18' represent first and second terminal units, respectively.

The analog dedicated line 13 is office branched at point P. A first branch line 13a is connected to the first ISDN backup unit 15. A second branch line 13b is connected to the second ISDN backup unit 15'. With this office branching of the analog dedicated line 13, data which is transmitted from the host unit 10 over the dedicated line 13 can be simultaneously transferred to a plurality of terminal units.

The ISDN backup unit 12' on the host unit side always transmits and receives data over the analog dedicated line 13 regardless of whether or not a defect occurs. When a defect occurs over the analog dedicated line 13, data is transmitted and received over the ISDN network 14.

When no defect takes place over the analog dedicated line 13, the ISDN backup units 15 and 15' on the terminal unit side transmit and receive data over the analog dedicated line 13. When a defect takes place at a local part of the analog dedicated line, the ISDN backup units 15 and 15' transmits and receives data over the ISDN network 14.

Construction of ISDN backup unit

Figure 8:
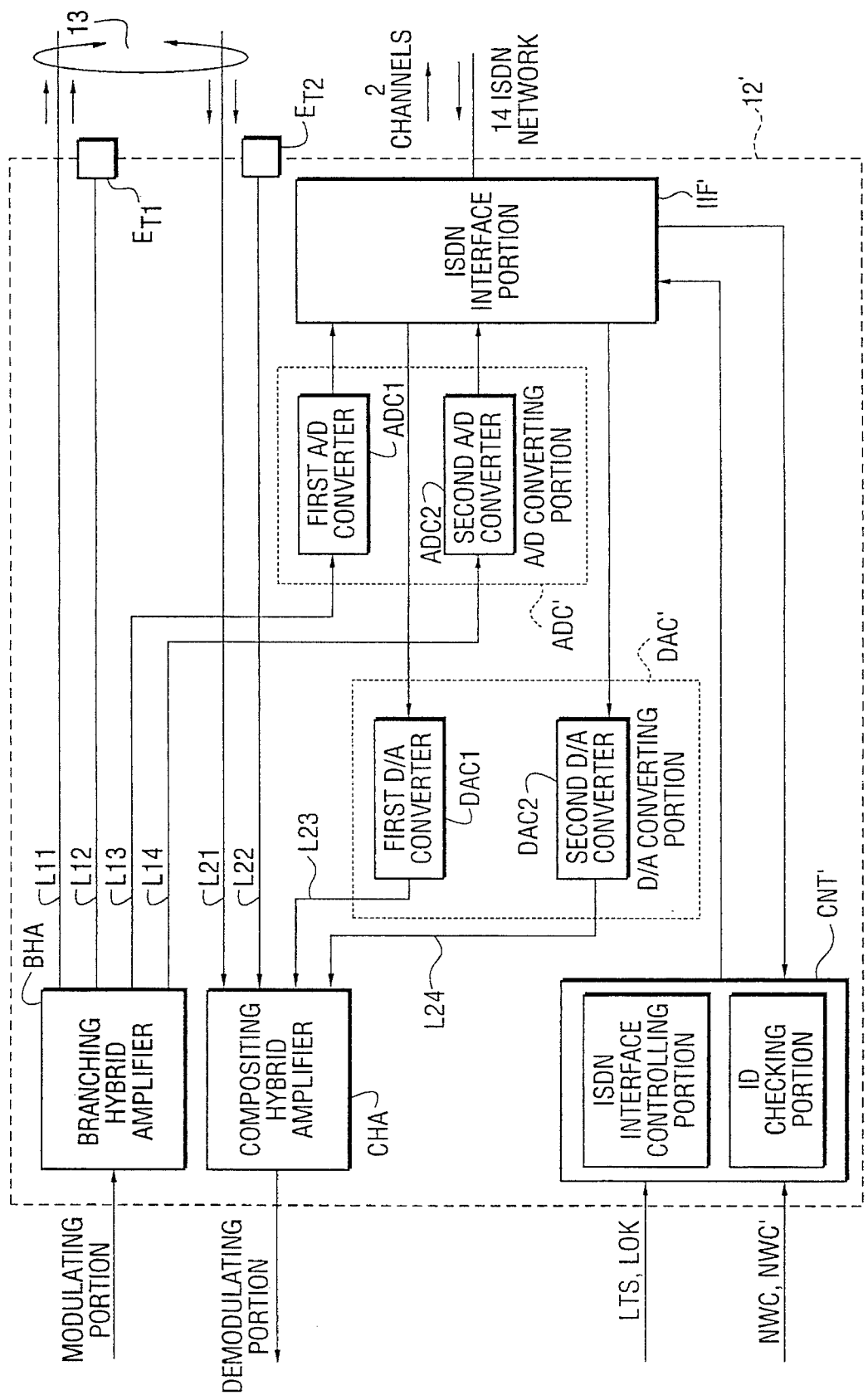
FIG. 8 is a block diagram of a backup unit on a host unit side.

FIG. 8 is a block diagram of the ISDN backup unit 12 on the host unit side in accordance with the embodiment shown in FIG. 7. The backup units 15 and 15' on the terminal unit side have the same construction as those shown in FIG. 5.

In FIG. 8, reference symbol IIF' represents an ISDN interface portion for multiplexing two channels of data in accordance with a basic speed interface (there are two B channels for information and one D channel for control signals), for transmitting the multiplexed data to the ISDN network 14, for dividing two channels of data received from the ISDN network, and for supplying the divided data. Reference symbol ADC' represents an A/D converting portion having two A/D converters ADC1 and ADC2, which receive analog signals from the modulating portion of the modem on the host unit side, convert the analog signals into digital signals in synchronization with a clock of the ISDN network, and supply the digital signals as two channels (first channel and second channel) of data to the ISDN interface portion IIF'. Reference symbol DAC' represents a D/A converting portion having two D/A converters DAC1 and DAC2, which receive the first channel data and the second channel data from the ISDN interface portion IIF', convert these data into analog signals, and supply the analog signals to the demodulating portion of the modem on the host unit side. The first A/D converter and the first D/A converter are used for the first channel, whereas the second A/D converter and the second D/A converter are used for the second channel. Thus, since the ISDN network has two B channels and one D channel, the host unit can communicate simultaneously with two terminal units.

Reference symbol CNT' represents a controller for controlling the transmission state of data. The controller CNT' is provided with an ISDN interface controlling portion, an ID checking portion, and so forth. When a defect occurs, the controller CNT' transmits and receives data over the ISDN network 14. In other words, the controller CNT' transmits and receives data over the ISDN network 14 when it receives a defect occurrence detecting signal LTS representing that a defect is occurring over the analog dedicated line 13, or a line switching signal NWC which is manually input from an operating portion by the operator.

Reference symbol BHA represents a branching hybrid amplifier. The branching hybrid amplifier BHA receives an analog signal from the modem on the host unit side and supplies the analog signal to all output lines L11 to L14. Reference symbol CHA represents a compositing hybrid amplifier for compositing analog signals which are received from the input lines L21 to L24 and supplies the composited signal to the demodulating portion of the modem on the host unit side. With the branching hybrid amplifier BHA and the compositing hybrid amplifier CHA, the ISDN backup unit 12 on the host unit side can always transmit and receive data over the analog dedicated line 13 regardless of whether or not a defect occurs. According to the present embodiment, data is communicated between the host unit and a plurality of terminal units in a polling system. Thus, data is not simultaneously supplied from the input lines L21–L24 to the compositing hybrid CHA.

Reference symbols ET1 and ET2 are extension connectors to which another ISDN backup unit is connected in tandem. An output signal of the modulating portion of the modem on the host unit side is supplied to the branching hybrid amplifier of the extension ISDN backup unit and an output signal of the BHA is outputted through the connector ET1. An output signal of the compositing hybrid amplifier of the extended ISDN backup unit is supplied through the connector ET2.

Overall operation (1) The case where no defect occurs

When no line defect takes place at any position of the analog dedicated line 13, the host unit 10 is connected with the first terminal unit 18 and the second terminal unit 18' over the analog dedicated line 13. Data communication is made between the host unit 10 and the first terminal unit 18 and between the host unit 10 and the second terminal unit 18' over the analog dedicated line 13.

(2) The case where a defect occurs between the office branch point and the analog dedicated line When a defect occurs at position x between the office branch point and the analog dedicated line 13, the defect occurrence detecting signal LTS is supplied to the ISDN backup units 12, 15 and 15'. Thus, the host unit 10 is connected with the first terminal unit 18 and the second terminal unit 18' over the ISDN network 14. Thereafter, until the analog dedicated line 13 restores from the defect, data communication is made between the host unit and the first terminal unit and between the host unit and the second terminal unit over the ISDN network 14.

In this case, to simultaneously transmit the same data from the host unit 10 to the first terminal unit 18 and the second terminal unit 18', the modulating portion of the modem 11 on the host unit side modulates the data and supplies the modulated signal as an analog signal. Thereafter, the analog signal is supplied to the first A/D converter ADC1 and the second A/D converter ADC2 through the branching hybrid amplifier BHA of the ISDN backup unit 12 on the host unit side. The A/D converted data is placed on the first channel and the second channel (two B channels) as data to be supplied to the first terminal unit 18 and the second terminal unit 18', respectively, and then transmitted to the ISDN network 14.

The ISDN interface portion IIF of the ISDN backup units 15 and 15' on the terminal unit side retrieves self addressed data transmitted from the host unit. The retrieved data is D/A converted and supplied to the demodulating portion of the modem on the terminal unit side.

(3) The case where a defect occurs between the office branch point and a terminal unit When a defect takes place at position y between the office branch point and the first terminal unit 18 (see FIG. 7), the host unit 10 is still connected with the second terminal unit 18' over the analog dedicated line 13. However, the host unit 10 is connected with the first terminal unit 18 over the ISDN network under the control of the ISDN backup units 12 and 15. Until the analog dedicated line 13a restores from the defect, data communication between the host unit 10 and the second terminal unit 18' is made over the analog dedicated line 13 and data communication between the host unit 10 and the first terminal unit 18 is made over the ISDN network 14. This operation also applies to the case where a defect occurs at position z between the office branch point and the second terminal unit 18'.

Figure 9:
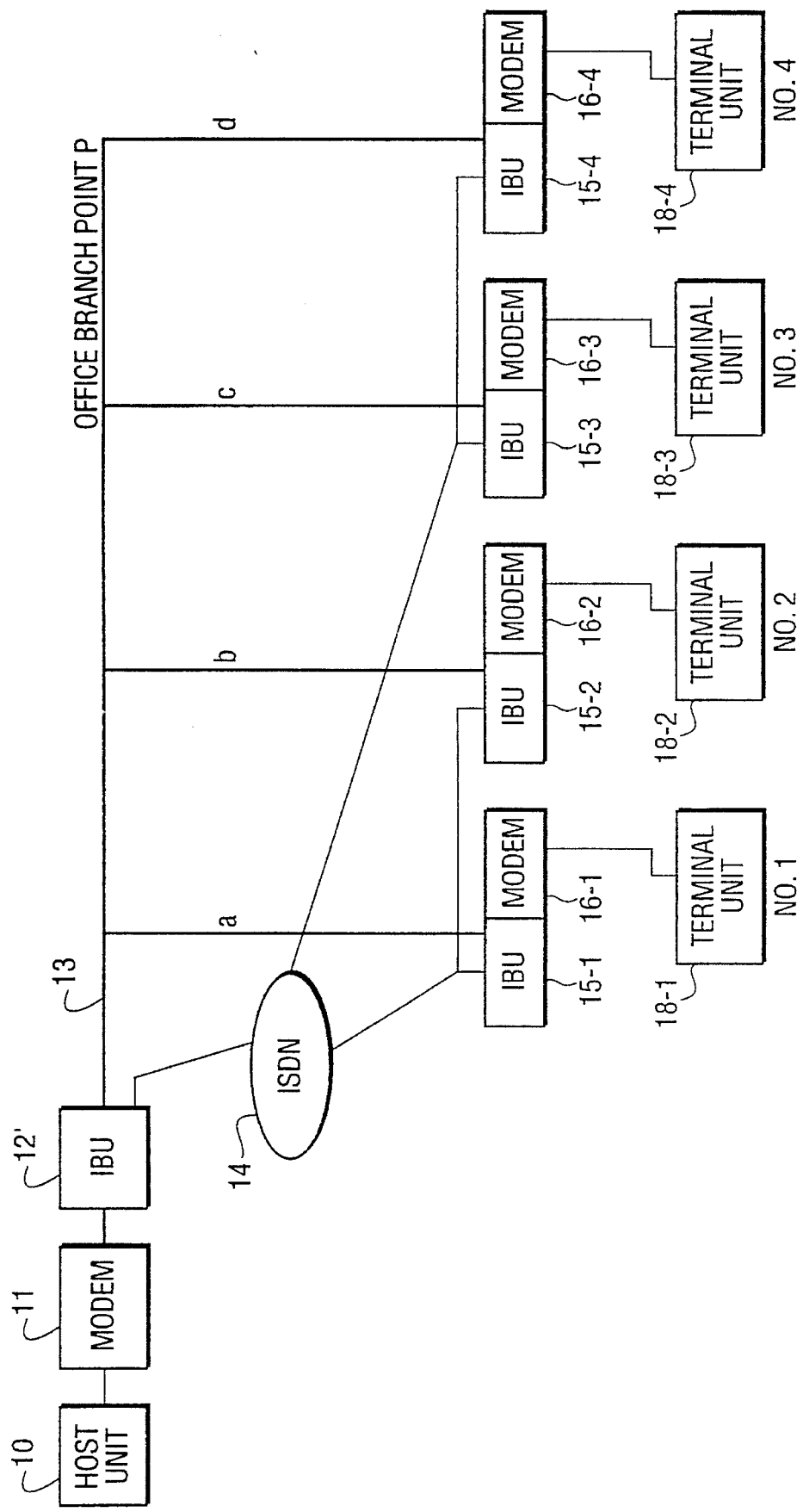
FIG. 9 is a block diagram of a multi-point connection in accordance with a third embodiment of the present invention.

(c) Third embodiment of the present invention FIG. 9 is a block diagram of a multi-point connection in accordance with a third embodiment of the present invention. The figure shows the third embodiment applicable to a backup system of a communication system having a multi-point connection comprising a host unit 10, a modem on the host unit side 11, ISDN backup unit (IBU) 12' on the host unit side, an analog dedicated circuit 13, an ISDN network 14, ISDN backup units (IBUs) 15-1 to 15-4 on the terminal unit side, modems 16-1 to 16-4 on the terminal unit side, and first to fourth terminal units 18-1 to 18-4, respectively.

The ISDN backup units 15-1 and 15-2 of the first and second terminal units 18-1 and 18-2 are bus connected to a first ISDN line. The backup units 15-3 and 15-4 of the third and fourth terminal units 18-3 and 18-4 are connected to a second ISDN line.

When defects occur over line part a and line part b between an office branch point and terminal units, as in the above mentioned second embodiment, the same data is transmitted from the host unit to the terminal units. The data is converted into an analog signal by the modem on the host unit side. The analog signal is converted into a digital signal by first and second A/D converters ADC1 and ADC2 through a branching hybrid amplifier BHA of the ISDN backup unit on the host unit side. An ISDN interface portion IIF' transmits these digital signals to two signal channels of the ISDN line as data to be transmitted to the terminal units.

In the ISDN backup units 15-1 to 15-4 on the terminal unit side, the backup units 15-1 and 15-2 of the terminal units connected to the line parts where defects occur receive data of respective signal channels of the ISDN line. The received data is D/A converted and then supplied to the modems 16-1 and 16-2 on the terminal unit side. Thus, data being received from the host unit 10 is transmitted to the terminal units 18-1 and 18-2 over the ISDN line.

On the other hand, when data is transmitted from the terminal unit 18-3 to the host unit 10, an analog signal which is transmitted from the terminal unit through the modem 16-3 is converted into a digital signal by the ISDN backup unit 15-3 on the terminal unit side. The digital signal is transmitted to the designated signal channel of the ISDN line.

The ISDN interface portion IIF' of the backup unit 12' on the host unit side receives digital signals through respective signal channels and restores the digital signals to their channel signals. The channel signals are supplied to the first D/A converter DAC1 or the second D/A converter DAC2 and then converted into analog signals. The analog signals are supplied to the modem 11 on the host unit side through the compositing hybrid amplifier CHA.

When data communication is made between the host unit 10 and each terminal unit in accordance with a polling system, since data is not supplied simultaneously to the first D/A converter DAC1 add the second D/A converter DAC2, one channel of data is transferred from the compositing hybrid amplifier CHA to the modem.

Likewise, data which is transmitted over the ISDN network from the backup unit 15-1 of the terminal unit 18-1 where a defect takes place is restored to a particular channel of a signal by the ISDN interface portion IIF' of the backup unit 12' on the host unit side. The channel signal is converted into an analog signal by the first D/A converter DAC1 or the second D/A converter DAC2. The analog signal is supplied to the modem 11 on the host unit side through the compositing hybrid amplifier CHA.

Thus, the terminal units in which line defects take place, for example, 18-1 and 18-3 are connected with the host unit 10 over the ISDN line. Data communication is made over the ISDN line.

According to the present embodiment, even if two line defects take place at the same time, the backup unit 12' on the host unit side can deal with such defects and backup data communication of four terminal units 18-1 to 18-4.

(d) Fourth embodiment of the present invention

Figure 10:
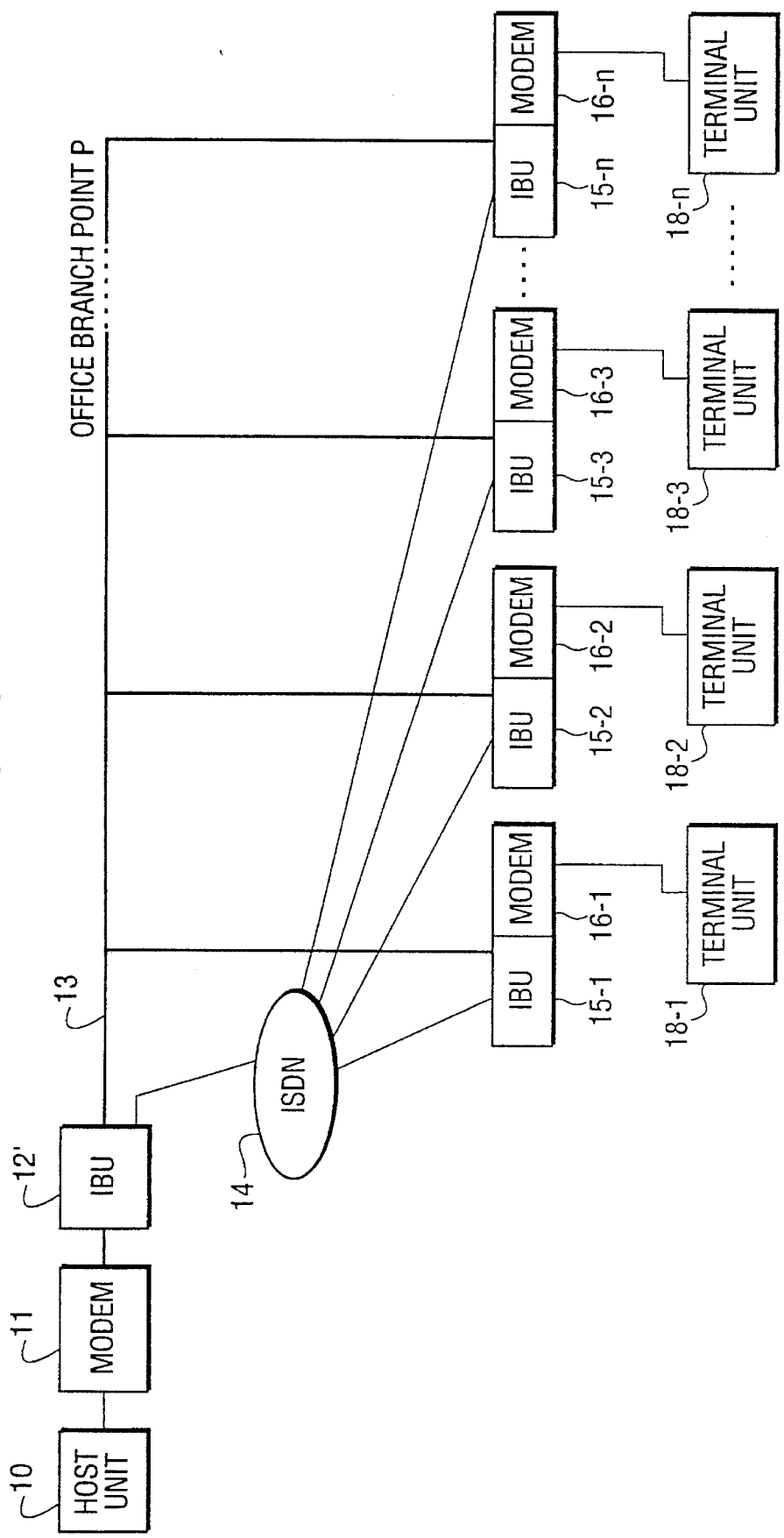
FIG. 10 is a block diagram of a multi-point connection in accordance with a fourth embodiment of the present invention.

FIG. 10 is a block diagram of a backup system of a communication system having a multi-point connection in accordance with a fourth embodiment. In the figure, reference numeral 10 represents host unit, reference numeral 11 represents a modem on the host unit side, reference numeral 12' represents an ISDN backup unit (IBU) on the host unit side, reference numeral 13 represents an analog dedicated line, reference numeral 14 represents an ISDN network, reference numerals 15-1 to 15-n represents ISDN backup units (IBUs) on the terminal unit side, reference numerals 16-1 to 16-n represent modems on the terminal unit side, and reference numeral 18-1 to 18-n are first to n-th terminal units, respectively.

In this embodiment, one backup unit 12' on the host unit side backs up n terminal units 18-1 to 18-n. However, the number of terminal units which can be supported by one backup unit 12' on the host unit side is 2. Thus, when three or more line defects take place at the same time, the backup unit 12' cannot deal with such defects. However, since the probability of three or more line defects occurring at the same time is very low, it is not necessary to consider such a case.

(e) Fifth embodiment of the present invention

Figure 11:
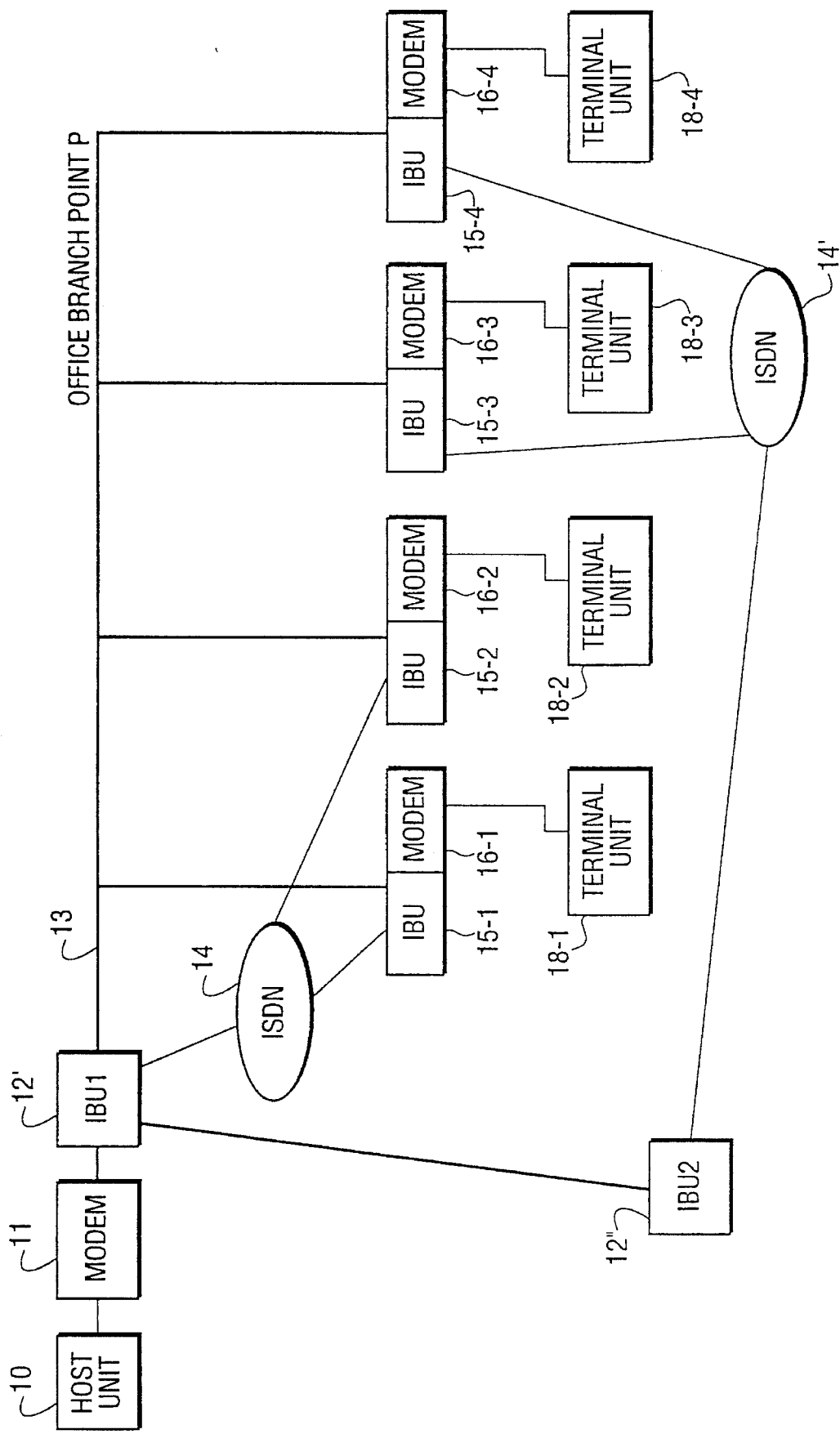
FIG. 11 is a block diagram of a multi-point connection in accordance with a fifth embodiment of the present invention.

FIG. 11 is a block diagram of a backup system of a communication system having a multi-point connection in accordance with a fifth embodiment of the present invention. In the figure, reference numeral 10 represents a host unit, reference numeral 11 represents a modem on the host unit side, reference numeral 12' represents an ISDN backup unit (IBU1) on the host unit side, reference numeral 12" represents an extension ISDN backup unit on the host unit side. Reference numeral 13 represents an analog dedicated line, reference numeral 14 and 14' represent ISDN networks, reference numerals 15-1 to 15-4 represent ISDN backup units (IBU2s) on the terminal unit side, reference numerals 16-1 to 16-4 represent modems on the terminal unit side, and reference numerals 18-1 to 18-4 represent first to fourth terminal units, respectively.

In this embodiment, by connecting the extension ISDN backup unit 12' to the extension connectors ET1 and ET2 (see FIG. 8) of the ISDN backup unit 12' on the host unit side in tandem, all four terminal units can be supported over the ISDN network. In addition, by extending this construction, with n ISDN backup units on the host unit side connected in tandem, 2×n terminal units can be supported over the ISDN network.

It will be readily apparent to those skilled in the art that various modifications may be made and other embodiments implemented without departing from the scope of the inventive concept.

According to the present invention, in normal state, data communication is made over an analog dedicated line.

When a defect takes place, data communication is made over an ISDN network. Thus, the data communication is backed up with high speed and high quality. Consequently, a highly reliable network can be accomplished.

In addition, according to the present invention, an ISDN backup unit has an A/D converting function in synchronization with a clock of an ISDN network and a D/A converting function for digital data received from the ISDN network. Thus, when data communication is backed up over the ISDN network, it is not necessary to change the timing of a modem. In addition, it is not necessary to synchronize the timings of host unit and terminal unit with the clock of the ISDN network. Consequently, terminal units and host units which are not provided with a function for synchronizing with the ISDN network can be readily applied thereto.

Moreover, according to the present invention, in a communication system having a multi-point connection, an A/D converting portion of a backup unit on a host unit side is provided with two A/D converters referred to as first and second A/D converters. In addition, a D/A converting portion is provided with two D/A converters referred to as first and second D/A converters. When data communication is backed up over the ISDN network, first channel data and second channel data transmitted from the host unit through the first and second A/D converters are multiplexed and transferred to the ISDN network. The first channel data and the second channel data which are received from the ISDN network are supplied to the first D/A converter and the second D/A converter, respectively. The output signals of these D/A converters are composited and supplied to the demodulating portion of the modem. Thus, even if a line defect takes place in a communication system having a multi-point connection, data communication can be backed up over the ISDN network.

What is claimed is:

1. A backup apparatus against a line defect for use in a communication system for performing data communication over an analog line through a modem, said modem comprising a modulating portion for converting a digital signal into an analog signal and for supplying the analog signal and comprising a demodulating portion for converting an analog signal into a digital signal and for supplying the digital signal, said backup apparatus comprising:

an ISDN interface portion for transmitting and receiving a digital signal over an ISDN line;

an A/D converting portion for receiving an analog signal from said modulating portion of said modem, for converting the analog signal into a digital signal synchronized with a timing of the ISDN line, and for supplying the synchronized digital signal to said ISDN line through said ISDN interface portion;

a D/A converting portion for receiving a digital signal from said ISDN line through said ISDN interface portion, for converting the digital signal into an analog signal, and for supplying the analog signal to said demodulating portion of said modem; and a controller portion which connects said modem with said analog line to transmit and receive data over said analog line when said analog line is functioning properly, and which connects said modem with said ISDN line to transmit and receive data through said A/D converting portion, said D/A converting portion, and said ISDN interface portion over said ISDN line when a defect occurs in said analog line.

2. The backup apparatus as set forth in claim 1, wherein said controller portion includes a detecting portion for detecting a line defect detecting signal, said detecting portion being arranged to control said A/D converting portion, said D/A converting portion, and said ISDN interface portion so as to transmit and receive data over said ISDN line.

3. A backup apparatus against a line defect for use in a communication system having a multi-point connection for transferring data between a host unit and a plurality of terminal units through a modem via an analog line, said backup apparatus comprising:

an ISDN interface portion for transmitting and receiving a digital signal over an ISDN line;

two A/D converting portions, referred to as a first A/D converting portion and a second A/D converting portion, each for receiving a first analog signal from said modem connected to said host unit, each for converting the first analog signal into a first digital signal synchronized with a timing of the ISDN line, and each for supplying the synchronized digital signal to said ISDN line through a respective channel in said ISDN interface portion;

two D/A converting portions, referred to as a first D/A converting portion and a second D/A converting portion, each for receiving a third and a fourth digital signal from said ISDN line through a respective channel in said ISDN interface portion, each for converting the third and fourth digital signal into a respective third and fourth analog signal, and each for supplying the third and fourth analog signal to said modem; and a controller portion which controls said modem to connect with said analog line to transmit and receive data over said analog line when said analog line is functioning properly and which controls said ISDN interface portion to transfer to said ISDN line from said host unit a channel data of digital signals which are received from said first and second A/D converting portions and to supply to said modem two analog signals from data transmitted over said ISDN line from said plurality of terminal units and converted by said first and second D/A converting portions when a defect occurs over said analog line.

4. A backup apparatus against line defect for use in a communication system having a multi-point connection for transferring data between a host unit and a plurality of terminal units, said backup apparatus comprising:

an ISDN interface portion for transmitting and receiving a digital signal over an ISDN line;

two A/D converting portions, referred to as a first A/D converting portions and a second A/D converting portion, each for receiving a first analog signal from a modem connected to said host unit, each for converting the first analog signal into a first digital signal synchronized with a timing of the ISDN line, and each for supplying the synchronized digital signal to said ISDN line through a respective channel in said ISDN interface portion;

two D/A converting portions, referred to as a first D/A converting portion and a second D/A converting portion, each for receiving a third and fourth digital signal from said ISDN line through a respective channel in said ISDN interface portion, each for converting the third and fourth digital signal into a respective third and fourth analog signal, and each for supplying the third and fourth analog signal to said modem;

a branching portion for receiving said first analog signal from said modem connected to said host unit and for supplying said first analog signal to an analog line connected between said host unit and said plurality of terminal units and to said first and second A/D converting portions;

a compositing portion for supplying to said modem a second analog signal received from said analog line connected between said host unit and said plurality of terminal units and said third and fourth analog signals received from said first and second D/A converting portions; and a controller portion which controls said modem to connect with said analog line to transmit and receive data over said analog line when said analog line is functioning properly and which controls said ISDN interface portion to supply to said ISDN line from said host unit a channel data of digital signals which are received from said first and second A/D converting portions through said branching portion and to supply to said modem through said compositing portion two analog signals transmitted over said ISDN line from said plurality of terminal units and converted by said first and second D/A converting portions when a defect occurs over said analog line.

5. The backup apparatus as set forth in claim 4, wherein:

said branching potion includes an input portion for receiving said first analog signal from said modem and an output portion for supplying said first analog signal to another backup apparatus, said compositing portion includes an input portion for receiving said second analog signal from said another backup apparatus, and said output portion of said branching portion and said input portion of said compositing portion connect a plurality of backup apparatuses to accommodate line defects which take place over a plurality of analog lines.

6. A backup method against a line defect for use in a communication system for performing communication over an analog line through a modem, said modem comprising a modulating portion for converting a digital signal into an analog signal and for supplying the analog signal and comprising a demodulating portion for converting an analog signal into a digital signal and for supplying the digital signal, said backup method comprising the steps of:

transmitting and receiving a digital signal over an ISDN line, using an ISDN interface portion;

receiving an analog signal from said modulating portion of said modem, converting the analog signal into a digital signal synchronized with a timing of the ISDN line, and supplying the synchronized digital signal to said ISDN line through said ISDN interface portion, using an A/D converting portion;

receiving a digital signal from said ISDN line through said ISDN interface portion, converting the digital signal into a analog signal, and supplying the analog signal to said demodulating portion of said modem, using a D/A converting portion; and controlling the transmitting and receiving of data over said analog line when said analog line is functioning properly, and controlling the transmitting and receiving of data through said A/D converting portion, said D/A converting portion, and said ISDN interface portion over said ISDN line when a defect occurs in said analog line, using a controller portion.

7. A backup method against a line defect for use in a communication system having a multi-point connection for transferring data between a host unit and a plurality of terminal units through a modem via an analog line, said backup method comprising the steps of:

transmitting and receiving a digital signal over an ISDN line, using an ISDN interface portion;

using a first A/D converting portion and a second A/D converting portion each for receiving a first analog signal from said modem connected to said host unit, each for converting the first analog signal into a first digital signal synchronized with a timing of the ISDN line, and each for supplying the synchronized digital signal to said ISDN line through a respective channel in said ISDN interface portion;

using a first D/A converting portion and a second D/A converting portion each for receiving a third and a fourth digital signal from said ISDN line through a respective channel in said ISDN interface portion, each for converting the third and fourth digital signal into a respective third and fourth analog signal, and each for supplying the analog signal to said modem; and controlling said modem to connect with said analog line for transmitting and receiving data over said analog line when said analog line is functioning properly and controlling said ISDN interface portion for transferring to said ISDN line from said host unit a channel data of digital signals which are received from said first and second A/D converting portions and for supplying to said modem two analog signals from data transmitted over said ISDN line from said plurality of terminal units and converted by first and second D/A converting portions when a defect occurs over said analog line, using a control portion.

8. A backup method against line defect for use in a communication system having a multi-point connection for transferring data between a host unit and a plurality of terminal units through a modem via an analog line, said backup method for comprising the steps of:

(a) transmitting and receiving a digital signal over an ISDN line, using an ISDN interface portion;

(b) using a first A/D converting portion and a second A/D convening portion, each for receiving a first analog signal from said modem connected to said host unit, each for converting the first analog signal into a first digital signal synchronized with a timing of the ISDN line, and each for supplying the synchronized digital signal to said ISDN line through a respective channel in said ISDN interface portion;

(c) using a first D/A converting portion and a second D/A converting portion, each for receiving a third and fourth digital signal from said ISDN line through a respective channel in said ISDN interface portion, each for converting the third and fourth digital signal into a respective third and fourth analog signal, and each for supplying the third and fourth analog signal to said modem;

(d) receiving said first analog signal from said modem connected to said host unit and supplying said first analog signal to an analog line connected between said host unit and said plurality of terminal units and to said first and second A/D converting portions, using a branching portion;

(e) supplying to said modem a second analog signal received from said analog line connected between said host unit and said plurality of terminal units and said third and fourth analog signals received from said first and second D/A converting portions, using a compositing portion; and (f) controlling said modem connected with said analog line to transmit and receive data over said analog line when said analog line is functioning properly and controlling said ISDN interface portion to supply to said ISDN line from said host unit a channel data of digital signals which are received from said first and second A/D converting portions through said branching portion and to supply to said modem through said compositing portion two analog signals transmitted over said ISDN line from said plurality of terminal units and converted by said first and second D/A converting portions when a defect occurs over said analog line, using a controller portion.

9. The backup method as set forth in claim 8, wherein:

said step (d) includes the step of using an input portion of said branching portion for receiving said first analog signal from said modem and using an output portion of said branching portion for supplying said first analog signal to another backup apparatus, said step (e) includes the step of receiving said second analog signal from said another backup apparatus using an input portion of said compositing portion, and said method further includes the step of (g) connecting a plurality of backup apparatuses to accommodate line defects which take place over a plurality of analog lines, using said output portion of said branching portion and said input portion of said compositing portion.

* * * * *

UNITED STATES PATENT AND TRADEMARK OFFICE
CERTIFICATE OF CORRECTION

PATENT NO. : 5,515,429
DATED : May 7, 1996
INVENTOR(S) : Noboru KAWADA et al.

It is certified that error appears in the above-indentified patent and that said Letters Patent is hereby corrected as shown below:

Cover Page, Item [56] and Column 2, Other Publications, line 5, change "Newtorking" to --Networking--.

Column 5, line 16, change "(MUMS)" to --(MDMS)--;
         line 30, delete ";"; and
         line 63; delete ";".

Column 7, line 43, change "lib" to --11b--; and
         line 56, insert --is-- after --14--.

Column 8, line 24, change "12'" to --12--.

Column 10, line 24, "Fig. 9" begins a new paragraph.

Signed and Sealed this

Twentieth Day of August, 1996

Attest:

BRUCE LEHMAN

Attesting Officer     Commissioner of Patents and Trademarks